United States Patent [19]

Aftergut et al.

[11] 4,308,161
[45] Dec. 29, 1981

[54] NOVEL YELLOW AZO DYES AND DICHROIC LIQUID CRYSTAL COMPOSITIONS MADE THEREWITH

[75] Inventors: Siegfried Aftergut, Schenectady; Herbert S. Cole, Scotia, both of N.Y.

[73] Assignee: General Electric Company, Schenectady, N.Y.

[21] Appl. No.: 175,004

[22] Filed: Aug. 4, 1980

[51] Int. Cl.³ ............ C09K 3/34; G02F 1/13; C09B 31/16
[52] U.S. Cl. .................. 252/299.1; 260/173; 350/349
[58] Field of Search ............ 252/299.1, 299.68; 350/349

[56] References Cited

U.S. PATENT DOCUMENTS

| | | | |
|---|---|---|---|
| 3,864,022 | 2/1975 | Moriyama et al. | 252/299.1 |
| 3,960,750 | 6/1976 | Moriyama et al. | 252/299.1 |
| 4,032,219 | 6/1977 | Constant et al. | 252/299.1 |
| 4,032,470 | 6/1977 | Bloom et al. | 252/299.7 |
| 4,098,301 | 7/1978 | Bloom et al. | 252/299.1 |
| 4,116,861 | 9/1978 | Aftergut et al. | 252/299.1 |
| 4,122,027 | 10/1978 | Cole, Jr. et al. | 252/299.1 |
| 4,128,496 | 12/1978 | Cole, Jr. et al. | 252/299.1 |
| 4,128,497 | 12/1978 | Cole, Jr. et al. | 252/299.1 |
| 4,137,193 | 1/1979 | Osman et al. | 252/299.1 |
| 4,141,627 | 2/1979 | Bloom | 252/299.1 |
| 4,145,114 | 3/1979 | Coates et al. | 252/299.1 |
| 4,153,343 | 5/1979 | Bloom et al. | 252/299.1 |
| 4,184,750 | 1/1980 | Bloom et al. | 252/299.1 |
| 4,211,473 | 7/1980 | Shanks | 252/299.1 |

FOREIGN PATENT DOCUMENTS

| | | | |
|---|---|---|---|
| 2902177 | 7/1980 | Fed. Rep. of Germany | 252/299.1 |
| 55-127485 | 2/1980 | Japan | 252/299.1 |
| 1459046 | 12/1976 | United Kingdom | 252/299.1 |

OTHER PUBLICATIONS

Bloom, A., et al., Mol. Cryst. Liq. Cryst., vol. 40, pp. 210-221 (1977).
Bloom, A., et al., Mol. Cryst. Liq. Cryst., vol. 41 (Letters) pp. 1-4 (1977).
Cox, R. J., Mol. Cryst. Liq. Cryst., vol. 55, pp. 1-32 (1979).
White, D. L., et al., J. Appl. Phys., vol. 45, No. 11, pp. 4718-4723 (1974).
Blinov, L., et al., J. Phys. (Paris), vol. 36, Cl., No. 3, pp. 69-76 (1975).

*Primary Examiner*—Teddy S. Gron
*Attorney, Agent, or Firm*—Geoffrey H. Krauss; James C. Davis; Marvin Snyder

[57] ABSTRACT

Novel yellow azo dye compositions and a liquid crystal composition containing the yellow azo dye composition are disclosed. The yellow azo dye composition, having terminal ester groups, has the general formula:

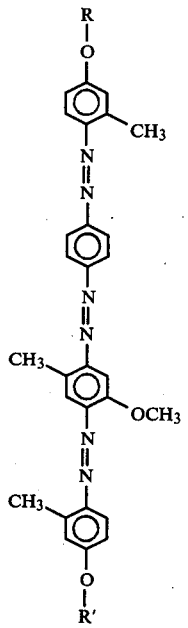

wherein R and R' are acyl groups having the formula:

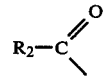

and $R_2$ is an alkyl or substituted alkyl wherein the alkyl has at least 4 carbon atoms, or $R_2$ is an aryl, arylalkyl, substituted aryl or substituted arylalkyl. When the yellow azo dichroic dyes are used alone, or in combination with other dyes, as a guest in a host liquid crystal material, they form a novel liquid crystal composition for use in liquid crystal displays. The disclosure also embraces a method of improving the black color of dichroic dyes for use in black liquid crystal displays, wherein a dye composition having a mixture of dichroic dyes of various colors and containing at least one yellow azo dichroic dye, as described above, is added to a host liquid crystal material. The mixture of dichroic dyes of various colors must be one which absorbs radiation in the spectral range of about 400-700 nm to produce the substantially black color for use in black liquid crystal displays.

23 Claims, No Drawings

NOVEL YELLOW AZO DYES AND DICHROIC LIQUID CRYSTAL COMPOSITIONS MADE THEREWITH

This invention relates to yellow azo dye compounds, and more particularly, to dichroic liquid crystal compositions containing the yellow azo dyes.

Yellow dyes having improved properties are desirable for various applications including the dyeing of textiles and the coloring of plastics and liquid crystal displays. Among those properties which are desirable for dyes, especially for dyes used in liquid crystal displays, are photostability of the dye, suitable extinction coefficient of the dye, solubility of the dye in liquid crystal hosts and light absorption in the desired spectral region. In liquid crystal displays, yellow dyes are especially useful for modifying the color of other dyes or as additives for black dichroic formulations. The fabrication of black liquid crystal displays poses a particular problem in that no black dichroic dyes are known, and black liquid crystal displays are made by mixing dichroic dyes of various colors in proper proportions to obtain a material which absorbs light radiation in the spectral range of about 400–700 nm resulting substantially in a black color. The dyes used in such mixtures must have a high order parameter, preferably at least 0.75, to ensure satisfactory brightness and contrast ratio. Heretofore, the only available yellow dyes of high order parameter contained Schiff base linkages within the dye molecule, and the presence of a double or triple bond in the base unit of the dye (exclusive of substituted groups and derivatives), leads to chemical and/or photochemical instability of the material.

Dye compounds suitable for use in solution with a liquid crystal material and containing azo linkages rather than Schiff base linkages in the dye molecule, are well known in the prior art. In U.S. Pat. No. 4,145,114, there is a disclosure of a substantial number of dye compounds suitable for use in liquid crystal materials and having an azo or azoxy linkage in the following general formula:

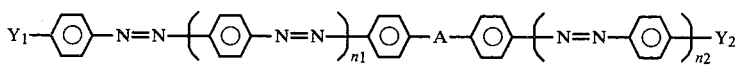

or a substituted derivative of the foregoing formula in which any one of the positions on any one of the benzene rings is substituted by halogen, methyl, halogen-substituted methyl, or methoxy; wherein A is an azo or azoxy linkage group; $n_1$ and $n_2$ are each integers in the inclusive range 0 to 4; and $Y_1$ and $Y_2$ are each one of the following groups: (i) hydrogen; or (ii) OR where R is an alkyl or arylalkyl group. Although the general structure of the dyes of U.S. Pat. No. 4,145,114 avoid the Schiff base linkages and thereby eliminate the chemical and/or photochemical instability disadvantages of materials containing the Schiff base linkages, it is always desirable to improve azo dyes and to improve liquid crystal displays containing azo dyes.

Accordingly, it is the primary object of the present invention to provide yellow azo dyes having a novel chemical composition.

It is another object of the present invention to provide novel liquid crystal compositions for use in liquid crystal displays.

Another object of the present invention is to provide yellow azo dyes having improved chemical and/or photochemical stability for use in liquid crystal compositions.

Another object of the present invention is to provide improved black dichroic liquid crystal displays made by mixing dichroic dyes of various colors.

Yet another object of the present invention is to provide a method of improving the black color of dichroic dyes used in black liquid crystal displays.

Still another object of the present invention is to provide a class of yellow dyes devoid of Schiff base linkages.

Other objects and advantages of the invention will become apparent as the description thereof proceeds.

These and other objects of the invention are achieved by providing aliphatic and aromatic esters of 4,4'-bis(2-methyl-4-hydroxyphenylazo)-2-methyl-5-methoxyazobenzene. A class of yellow azo dyes comprising the general formula:

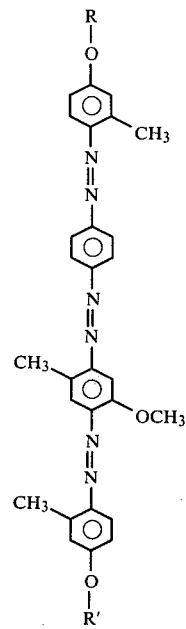

wherein R and R' are acyl groups having the formula:

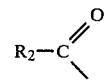

and $R_2$ is an alkyl or substituted alkyl wherein the alkyl has at least 4 carbon atoms or $R_2$ is an aryl, arylalkyl, substituted aryl, or substituted arylalkyl, has been discovered in accordance with the present invention. The acyl groups in the general formula form terminal ester groups at the hydroxy positions of the 4,4'-bis(2-methyl-4-hydroxyphenylazo)-2-methyl-5-methoxyazobenzene.

In accordance with the present invention, there is also provided a liquid crystal composition for use in a liquid crystal display, comprising:

a host liquid crystal material; and a guest dye dissolved in said host liquid crystal material, said dye having the general formula:

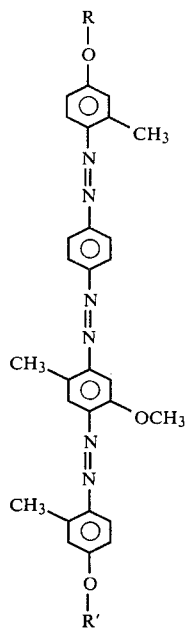

wherein R and R' are acyl groups and form an ester with the general formula, and R and R' have the general formula:

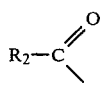

wherein $R_2$ is alkyl or substituted alkyl wherein the alkyl has at least 4 carbon atoms, or $R_2$ is an aryl, arylalkyl, substituted aryl or substituted arylalkyl.

In another embodiment of the present invention, it has been found that when a liquid crystal composition for use in a liquid crystal display comprises a host liquid crystal material and a guest yellow dye dissolved in said host liquid crystal material in conjunction with other dichroic dyes of various colors which absorb radiation within the spectral range of about 400–700 nm, improved black liquid crystal compositions can be obtained when said yellow dye has the general formula:

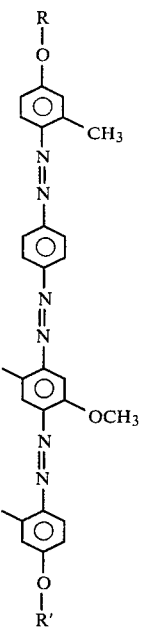

wherein R and R' are acyl groups and form an ester with the general formula, and R and R' have the formula:

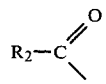

wherein $R_2$ is alkyl or substituted alkyl, and the alkyl has at least 4 carbon atoms, or $R_2$ is an aryl, arylalkyl, substituted aryl or substituted arylalkyl. Thus, improved black liquid crystal compositions and a method for improving the quality of black liquid crystal compositions are possible by using the yellow dichroic azo dyes having at least one terminal ester linkage in the para-position on an ortho-methyl substituted phenylazo azobenzene and one of the benzene rings of the azobenzene has a methyl group substituted in the 2-position and a methoxy group substituted in the 5-position, in a dye having at least three azo linkages. Thus, the invention embraces a method of improving the black color of dichroic dyes for use in black liquid crystal displays, comprising adding to a host liquid crystal material, a dye composition having a mixture of dichroic dyes of various colors in proper proportion to obtain a material which absorbs radiation in the spectral range of about 400–700 nm wherein at least one of the dichroic dyes of various colors is a yellow azo dichroic dye having the general formula:

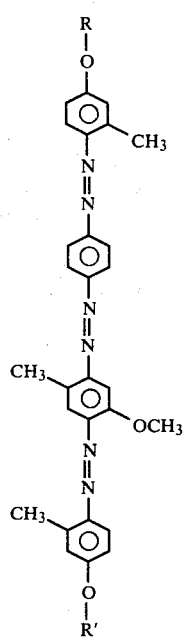

wherein R and R' are acyl groups and form an ester with the general formula, and R and R' have the formula:

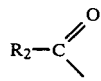

wherein $R_2$ is alkyl or substituted alkyl and the alkyl has at least 4 carbon atoms, or $R_2$ is an aryl, arylalkyl, substituted aryl or substituted arylalkyl; and heating the composition to dissolve the dyes in the liquid crystal host material.

In accordance with the present invention, the chemical and/or photochemical instability of the prior art has been substantially reduced by using the azo linkages in the yellow azo dichroic dyes having terminal ester groups. Furthermore, a new class of yellow dyes has been synthesized, and liquid crystal displays of various colors can be fabricated by mixing at least one of the new class of yellow azo dyes with at least one dichroic dye of a different color and dissolving the mixture in a host liquid crystal material.

These and various other objects, features and advantages of the invention can be best understood from the following detailed description.

The yellow azo dyes or guest yellow azo dyes of the present invention have been synthesized by a reaction mechanism which produces the following general formula representing the class of yellow azo dyes.

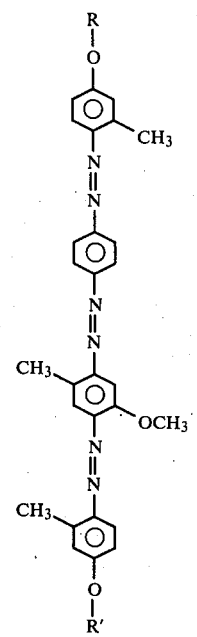

having a relatively elongated and rigid molecular structure. The yellow dyes have three azo (—N=N—) linking groups, one of the azo linking groups joining an unsubstituted benzene ring to a benzene ring having a methyl group substituted in the 2-position and a methoxy group substituted in the 5-position, and the other two azo groups joining the foregoing substituted and unsubstituted benzene rings at the para-position to a third and fourth benzene ring having a methyl group substituted in the ortho-position (relative to the azo linkage) and an ester group substituted in the para-position (relative to the azo linkage), so that the para-substituted ester forms the terminal portion of the yellow azo dye molecule. The ester end groups or terminal ester groups normally designated as auxochromes, e.g., electron-withdrawing groups or electron-repelling groups, enhance the characteristic yellow color of the dyes by enhancing absorption at the blue end of the spectrum, e.g., 380–410 nm. R and R' in the general formula for the yellow azo dyes and guest yellow azo dyes, represent acyl groups which form the ester. In accordance with preferred embodiments of the present invention, R=R'; however, it is within the scope of the present invention to provide dyes of the general formula wherein R and R' comprise different acyl groups, and in fact, R and R' may represent any combination of the alkyl, substituted alkyl, aryl, arylalkyl, substituted aryl or substituted arylalkyl as specified in this invention.

The acyl groups of the present invention represented by R and R' in the general formula, have the following formula:

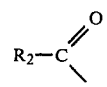

The acyl group is a functional group, and as used herein, is generally the functional group of an acid chloride. In various embodiments, the acyl group of the yellow azo dyes of the present invention, may be an aromatic (aryl) group or a substituted aromatic group or mixtures thereof. However, the acyl group may also be an aliphatic (alkyl), substituted aliphatic, arylalkyl or substituted arylalkyl or mixtures thereof. Thus, in accordance with the present invention, $R_2$ in the formula representing the acyl groups, may be aryl, arylalkyl, substituted aryl, substituted arylalkyl, alkyl having at least 4 carbon atoms or substituted alkyl having at least 4 carbon atoms, or mixtures of the foregoing.

The dyes of the present invention may be synthesized by any suitable manner. In one preferred method of synthesis, 2-methyl-5-methoxy-4,4'-diaminoazobenzene is tetrazotized using sodium nitrite and dilute hydrochloric acid. The tetrazonium solution is then coupled with metacresol in a basic solution to give 4,4'-bis-(2-methyl-4-hydroxyphenyl-azo)-2-methyl-5-methoxyazobenzene. This product is then reacted with the appropriate acid chloride in a suitable solvent, for example, pyridine. The mixture is heated for an appropriate time and at a suitable temperature to complete the reaction, e.g., about 1-4 hours at about 80° C.-120° C. Upon cooling, the yellow dye precipitates and is collected. In certain instances, hexane or other suitable aliphatic hydrocarbons may be used to promote precipitation. In the foregoing synthesis, for every mole of 2-methyl-5-methoxy-4,4'-diaminoazobenzene, about two moles of hydrochloric acid and about two moles of sodium nitrite were used. Two moles of the coupling agent (m-cresol) was used for every mole of 2-methyl-5-methoxy-4,4'-diaminoazobenzene. If both acyl groups on the dye molecule are the same, a slight molar excess of the appropriate acid chloride, such as benzoyl chloride, may be used. If the acyl groups differ on the same molecule, the acylation is carried out in two separate steps. The first acylation is carried out with about one mole of the appropriate acid chloride per mole of 2-methyl-5-methoxy-4,4'-diaminoazobenzene in a basic solution such as an organic base (pyridine), and the solution is heated at a suitable temperature until the reaction is complete, e.g., it is heated for three hours at 110° C. A second acylation is carried out with about one mole of the appropriate acid chloride, per mole of the monoester of 2-methyl-5-methoxy-4,4'-diaminoazobenzene in a basic solution such as an organic base (pyridine), and the solution is heated at a suitable temperature until the reaction is complete, e.g., it is heated for three hours at 110° C. Thereafter, the solution is cooled. The yellow dye precipitates and is collected. A precipitating agent, such as n-hexane, may be added to promote the precipitation of the dye from the solution.

In preferred embodiments, the acyl group represented by the formula:

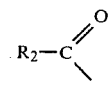

is an aromatic or substituted aromatic group designated herein as an aryl or substituted aryl group. As used herein, aryl generally refers to a phenyl group or a naphthyl group. Examples of several acyl groups which form the ester linkage with the 4,4'-bis-(2-methyl-4-hydroxy-phenylazo)-2-methyl-5-methoxyazobenzene intermediate formed from the tetrazonium solution and the m-cresol as discussed above, are shown in Table 1 below where the illustrated acyl group represents any combination of R and R' in the general formula of this invention but preferably where R=R'. In Table 1 below, the corresponding acid chloride for preparing the particular dye from the 4,4'-bis-(2-methyl-4-hydroxyphenylazo)-2-methyl-5-methoxy-azobenzene intermediate as discussed above, is also shown along with the order parameter (S) in liquid crystal E-7 described infra. In all cases, the color of the dye was yellow or a shade of yellow such as yellow-orange.

TABLE 1
EXAMPLES OF YELLOW OR YELLOW-ORANGE AZO DYES HAVING ACYL GROUPS

| DYE NO. | ACYL GROUP (R and R' of GENERAL FORMULA) | CORRESPONDING ACID CHLORIDE | ORDER PARAMETER IN E-7 LIQUID CRYSTAL |
|---|---|---|---|
| 1. | ⌬—C(=O)— | benzoyl chloride | S > 0.75 |
| 2. | $H_3CO$—⌬—C(=O)— | p-anisoyl chloride | S > 0.75 |
| 3. | $H_{11}C_5O$—⌬—C(=O)— | 4-pentoxybenzoyl chloride | S = 0.75 |
| 4. | $H_{15}C_7O$—⌬—C(=O)— | 4-heptoxybenzoyl chloride | S > 0.75 |
| 5. | 3,5-($OCH_3$)$_2$—⌬—C(=O)— | 3,5-dimethoxybenzoyl chloride | S > 0.75 |
| 6. | $H_{11}C_5$—⌬—C(=O)— | 4-pentylbenzoyl chloride | S > 0.75 |
| 7. | $H_{15}C_7$—⌬—C(=O)— | 4-heptylbenzoyl chloride | S > 0.75 |

TABLE 1-continued
EXAMPLES OF YELLOW OR YELLOW-ORANGE AZO DYES HAVING ACYL GROUPS

| DYE NO. | ACYL GROUP (R and R' of GENERAL FORMULA) | CORRESPONDING ACID CHLORIDE | ORDER PARAMETER IN E-7 LIQUID CRYSTAL |
|---|---|---|---|
| 8. | N≡C—⟨○⟩—C(=O)— | 4-cyanobenzoyl chloride | $S > 0.75$ |
| 9. | O₂N—⟨○⟩—C(=O)— | p-nitrobenzoyl chloride | $S > 0.75$ |

Other aromatic (aryl) acyl groups can be used in the general formula and can be prepared from the corresponding acid chloride. Other aryl groups include benzene (phenyl) and naphthalene (naphthyl) and the halogen, nitro, cyano, amino, alkyl, aryloxy, biaryl, alkoxy, derivatives substituted upon the aryl group, mixtures and combinations of the foregoing derivatives substituted upon the aryl group, and the like. Other exemplary aromatic acyl groups preferred in accordance with the present invention include para-n-decylbenzoyl, p-ethoxybenzoyl, p-butoxybenzoyl, p-hexyloxybenzoyl, p-N,N-dimethylaminobenzoyl, p-N,N-diethylaminobenzoyl, p-N,N-dibutylaminobenzoyl, p-hydroxybenzoyl, p-chlorobenzoyl, p-bromobenzoyl, p-benzoyloxybenzoyl, p-phenoxybenzoyl, p-toluyl, p-ethylbenzoyl, and p-phenylbenzoyl. Naturally, it is within the purview of one skilled in the art to add a considerable number of acyl groups to the foregoing list. As explained above, dyes of the general formula with different R and R' groups can be synthesized by the reaction of one mole of the 4,4'-bis-(2-methyl-4-hydroxyphenylazo)2-methyl-5-methoxyazobenzene intermediate with one mole of the appropriate acyl chloride to provide a reaction product having one acyl group thereon, followed by the reaction of one mole of the reaction product having one acyl group thereon with one mole of another appropriate acyl chloride to form the yellow azo dye composition having two different acyl groups thereon.

For example, in a first reaction, about 1.0 mole of benzoyl chloride per mole of the 4,4'-bis-(2-methyl-4-hydroxyphenylazo)-2-methyl-5-methoxyazobenzene intermediate is heated at about 110° C. for about three hours to form an ester (I) as follows:

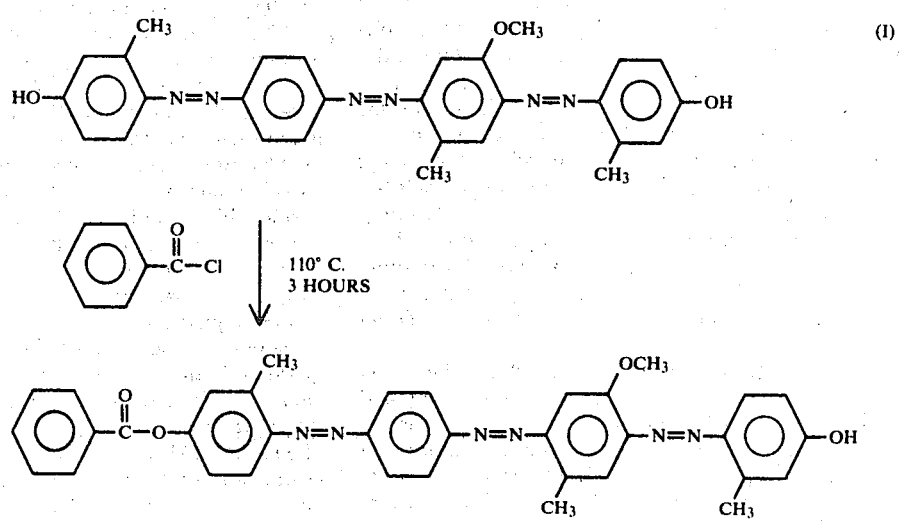

In a second reaction, about 1.0 mole of p-anisoyl chloride per mole of the ester of formula (I) above is heated at about 110° C. for about three hours under the reaction conditions discussed above to form an ester (II) as follows:

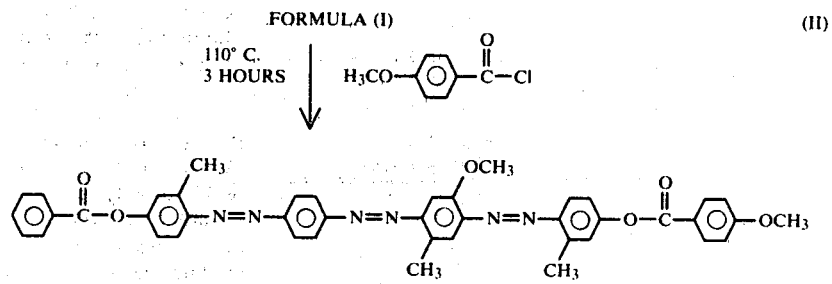

The yellow azo dye (II) is 4-(2-methyl-4-benzoyloxy phenylazo)-4'-(2-methyl-4-anisoyloxy phenylazo)-2-methyl-5-methoxyazobenzene.

The acyl groups of the present invention may also be alkyl or substituted alkyl acyl groups wherein the alkyl or substituted alkyl has at least 4 carbon atoms. The acyl groups of the present invention can also be arylalkyl or substituted arylalkyl acyl groups. Thus, in accordance with the general formula of this invention, R and R' may be the foregoing enumerated acyl groups of the formula:

wherein $R_2$ is an alkyl or substituted alkyl and the alkyl has at least 4 carbon atoms, or $R_2$ can be arylalkyl or substituted arylalkyl. The substituted groups may be any of the conventional derivatives well known in the art including the halogens (e.g., chlorine and bromine), hydroxy, nitro, cyano, amino, alkyl, aryloxy, alkoxy, and the like, and various combinations and permutations of the foregoing derivatives. In preferred embodiments, the foregoing acyl derivatives can be obtained by using the corresponding acid chloride in the synthesis described above. In accordance with the present invention, the acyl groups on the yellow azo dye molecule can be the same or different groups including different alkyl or substituted alkyl or different arylalkyl or substituted arylalkyl groups and can also comprise the foregoing groups mixed with aromatic acyl groups.

When the invention has alkyl or substituted alkyl acyl groups, in preferred embodiments, the alkyl or substituted alkyl has about four to about 20 carbon atoms. Preferred alkyl groups include n-butyl, iso-butyl, n-amyl, n-hexyl, n-heptyl, n-octyl, n-nonyl, n-decyl and stearyl and the like and the halogen (e.g., chlorine and bromine), nitro, amino, hydroxy and cyano derivatives thereof.

Specific examples of alkyl acid chlorides which may be used in a reaction with the 4,4'-bis-(2-methyl-4-hydroxy-phenylazo)-2-methyl-5-methoxyazobenzene intermediate described above in the appropriate molar quantities include n-butyryl chloride, iso-butyric acid chloride, n-valeryl chloride, iso-valeryl chloride, n-caprylic acid chloride (octanoyl chloride), pelargonic acid chloride (pelargonyl chloride or nonanoyl chloride), n-caproic acid chloride (n-caproyl chloride), n-capric acid chloride, stearic acid chloride (stearyl chloride), palmityl chloride, and the like.

Examples of the above yellow azo dyes having alkyl acyl groups are shown in Table 2 below where the acyl group and the corresponding acid chloride are illustrated:

TABLE 2

EXAMPLES OF YELLOW AZO DYES HAVING ALKYL ACYL GROUPS

| DYE NO. | ACYL GROUP (R and R') OF GENERAL FORMULA | CORRESPONDING ACID CHLORIDES |
|---|---|---|
| 1 | $C_2H_5-CH_2-\overset{O}{\overset{\|}{C}}-$ | n-butyryl chloride |
| 2. | $(CH_3)_2-CH-\overset{O}{\overset{\|}{C}}-$ | iso-butyric acid chloride |
| 3. | $CH_3-(CH_2)_3-\overset{O}{\overset{\|}{C}}-$ | n-valeryl chloride |
| 4. | $(CH_3)_2-CH-CH_2\overset{O}{\overset{\|}{C}}-$ | iso-valeryl chloride |
| 5. | $CH_3-(CH_2)_6-\overset{O}{\overset{\|}{C}}-$ | octanoyl chloride |
| 6. | $CH_3-(CH_2)_4-\overset{O}{\overset{\|}{C}}-$ | n-caproyl chloride |
| 7. | $CH_3(CH_2)_7-\overset{O}{\overset{\|}{C}}-$ | pelargonyl chloride |
| 8. | $CH_3-(CH_2)_8-\overset{O}{\overset{\|}{C}}-$ | n-capric acid chloride |
| 9. | $C_{17}H_{35}-\overset{O}{\overset{\|}{C}}-$ | stearyl chloride |
| 10. | $C_{15}H_{31}-\overset{O}{\overset{\|}{C}}-$ | palmityl chloride |

To prepare the yellow azo dyes of this invention having alkyl acyl groups, substituted alkyl acyl groups, arylalkyl acyl groups, or substituted arylalkyl acyl groups, the corresponding acid chloride (acyl chloride) is reacted with the 4,4'-bis-(2-methyl-4-hydroxyphenylazo)-2-methyl-5-ethoxyazobenzene intermediate in the same manner described above for the preparation of the aromatic acyl compounds. 2-Methyl-5-methoxy-4,4'-diaminoazobenzene is tetrazotized using two moles of dilute hydrochloric acid and 2 moles of either sodium nitrite or two moles of nitrous acid per each mole of 2-methyl-5-methoxy-4,4'-diaminoazobenzene. An intermediate tetrazonium chloride solution is formed, and this is coupled with m-cresol in a basic solution, e.g., an organic base, such as, pyridine, to yield the 4,4'-bis-(2-methyl-4-hydroxyphenylazo)-2-methyl-5-methoxyazobenzene intermediate. This product is then reacted with the appropriate aliphatic (alkyl) acid chloride or arylaliphatic (arylalkyl) acid chloride as discussed above by using the Schotten-Baumann technique in an organic base such as pyridine. A slight molar excess of the appropriate aliphatic acid chloride is added to the 4,4'-bis-(2-methyl-4-hydroxyphenylazo)-2-methyl-5-methoxyazobenzene intermediate to produce the yellow azo dye product. For example, slightly over 2 moles of stearyl chloride is added to the 4,4'-bis-(2-methyl-4-hydroxyphenylazo)-2-methyl-5-methoxyazobenzene in pyridine solvent, and the mixture is heated for about three hours at about 110° C. to form the product. Upon cooling, the yellow azo dye precipitates and may be filtered from the solution. Conventional precipitating promoters, such as n-hexane, can be added to promote precipitation.

The yellow azo dyes prepared in accordance with this invention can be used in any conventional manner. For example, they can be used alone or in combination with other dyes, modifiers or adjuvants to dye textiles or to color plastic materials. They can be used alone or in combination with other dyes, modifiers or adjuvants to color liquid crystal displays. In preferred embodiments, the yellow azo dyes are used with liquid crystal host materials well known in the art to improve the color of the liquid crystal composition for use in a liquid crystal display. When the yellow azo dyes of this invention are used with a liquid crystal host, they are called guest dyes, and they are dissolved in the host liquid crystal material, that is, the guest yellow azo dye is soluble in the host liquid crystal material. Many of the yellow azo dyes require mild heat, e.g., above ambient to 110° C. to promote their dissolution in the host liquid crystal.

Any liquid crystal host material may be used in accordance with the present invention. In those embodiments of the present invention wherein the yellow tris-azo dichroic dye material is used as a guest dye in a host liquid crystal material, it is not critical which of the many well known liquid crystal materials or combinations thereof may be used as long as the yellow azo dye materials of the present invention are soluble in the host liquid crystal material and as long as the yellow azo dye or dyes of the present invention are compatible with or have no adverse effect upon the host liquid crystal material. In preferred liquid crystal compositions of the present invention, the host liquid crystal material is a nematic liquid crystal of positive or negative dielectric anisotropy, a cholesteric liquid crystal of positive or negative dielectric anisotropy and mixtures thereof, that is, mixtures of nematic liquid crystals and cholesteric liquid crystals modified with other optically active compounds.

Any conventional liquid crystal host material can be used with the yellow tris-azo dyes of the present invention. The liquid crystal hosts can be selected by one skilled in the art depending upon the electro-optic effect to be utilized. Nematic liquid crystals include the biphenyl liquid crystals such as E-7 and E-8 from BDH, Ltd.

Biphenyl liquid crystal E-7 is a eutectic of the following general formula:

where R is a mixture of $C_5H_{11}$, $C_7H_{15}$, $C_8H_{17}O$ and

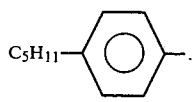

Other nematic liquid crystals include esters available from E. Merck Associates and Hoffman-LaRoche Co., phenylcyclohexanes and azoxy mixtures available from E. Merck Associates, alkoxybenzylidene anils such as those having the structural formula:

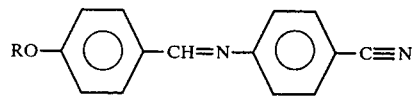

wherein OR is an alkoxy radical preferably having from 1 to 7 carbon atoms or an acyloxy radical having from 2 to 7 carbon atoms, p-anisylidene-p'-n-butylaniline, p-anisylidene-p'-aminophenyl-butyrate, p-(p'-methoxyphenylazoxy)butylbenzene, p-(p'-ethoxyphenylazo)-phenylheptanoate, p-n-hexylbenzoic acid-p'-n'hexyloxy-phenyl ester, and other liquid crystal materials, such as the esters disclosed in U.S. Pat. No. 3,984,344, p-n-hexylbenzylidene-p'-amino-benzonitrile, p-capryloxybenzylidene-p'-aminobenzonitrile, p-cyanophenyl-p'-n-heptylbenzoate, p-cyanobenzylidine-p'-n-butoxyaniline, p-cyanobenzylidene-p'-aminophenylvalerate, p-azoxyanisole, butyl-p-(p'-ethoxyphenoxycarbonyl)phenylcarbonate, p(p'-ethoxyphenylazo)-phenylheptanoate, and the like. Another class of liquid crystal materials have the general formula:

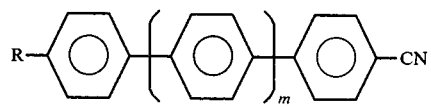

wherein R is an alkyl or alkoxy group and m=0 or 1, at least one of said compounds being cyanobiphenyl wherein m=0. Generally, nematic liquid crystals fall within the class of chemical compounds having the general formula:

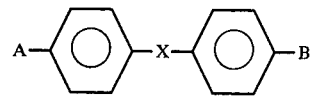

wherein X is an azomethine linkage of the Schiff base class, X is an ester, vinylene, acetylene, azo or azoxy, or X is merely a single bond connecting the two benzene rings; and A and B are $C_nH_{2n+1}$ (alkyl group); $C_nH_{2n+1}O$ (alkoxy group); or $C_nH_{2n+1}COO$ (ester group). Cholesteric liquid crystals can be pure compounds such as derivatives of cholesterol or noncholesteric materials. These are characterized by optical activity arising from the absence of molecular symmetry.

In accordance with the present invention, it is not critical how much of the dye is present in the host liquid crystal as long as the dye is soluble therein. In preferred embodiments, about 0.05% by weight to about 1.0% by weight, and more preferably about 0.1% by weight to about 0.5% by weight, (based upon the weight of the liquid crystal host material) of the dye of this invention or mixtures of dyes of this invention are present in the host liquid crystal. One skilled in the art can adjust the amount of yellow tris-azo dye as desired and can determine the amount required for maximum absorption at a particular wavelength. The upper limit of the amount of dye varies with the solubility of the particular dye in the host liquid crystal. The amount of guest dichroic yellow tris-azo dye of the present invention in the host liquid crystal material is that amount up to the limit of maximum solubility in the host of yellow tris-azo dye required to color, tint or shade the host liquid crystal, required to add to the yellow color of the host liquid crystal material, or required to contribute to the color of a mixture of dyes used in the host liquid crystal material, e.g., the use of the yellow dye or dyes of this invention with dyes of other colors to improve the "blackness" of guest dyes in the host liquid crystal. The guest yellow azo dichroic dyes of this invention are particularly useful in black liquid crystal displays because improved black liquid crystal materials can be obtained by mixing dichroic dyes of various colors in proper proportions to obtain a material which absorbs radiation in the spectral range of about 400–700 nm, and the yellow azo dyes of this invention substantially improve the absorption in the 400 nm region (the blue region) of such dye mixtures. Thus, in accordance with the present invention, an improved method of making black dichroic dyes or black dichroic liquid crystal displays is achieved by providing a host liquid crystal material and mixing therewith dichroic dyes of various colors in suitable proportions to obtain a material which absorbs radiation in the spectral range of about 400–700 nm wherein the dichroic dyes of various colors include a dye having the general formula:

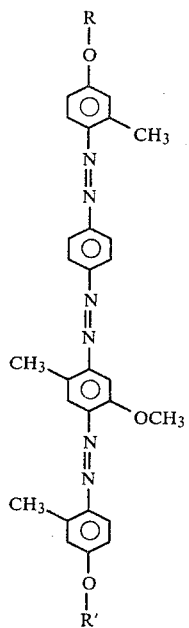

wherein R and R' are acyl groups and form an ester with the general formula, and R and R' have the formula:

wherein $R_2$ is an alkyl or substituted alkyl, the alkyl or substituted alkyl having at least 4 carbon atoms, or $R_2$ is an aryl, arylalkyl, substituted aryl, or substituted arylalkyl. The Appropriate mixture of dichroic dyes of various colors in suitable proportions to obtain a material which absorbs radiation in the spectral range of about 400–700 nm, and which approaches a substantially black appearance in color, is within the purview of one skilled in the art, and the improvement of the present invention is directed to the use of one or more of the yellow tris-azo dyes having the designated acyl or ester groups to improve the "blackness" of the dichroic dye mixture made from various colors. For example, the yellow tris-azo dyes of this invention, when mixed with appropriate blue dye in a liquid crystal, produce an improved greenish-black display. The yellow tris-azo dyes of this invention used in such mixtures have substantially high order parameters (S) generally at least 0.75 and above, to ensure satisfactory brightness and contrast ratio.

Two types of liquid crystal displays having two different liquid crystal hosts were prepared with the dyes of the present invention. In one of the types of liquid crystal display, the yellow azo dyes were dissolved at a concentration of about 0.5% to about 1% (by weight of the liquid crystal host material) in a nematic liquid crystal such as E-7 (from BDH Co.), ROTN-404 (from Hoffman LaRoche) or Licristal-1132 (from E. Merck Associates). The resulting solution was sandwiched between conductive glass plates in test cells whose surfaces are in contact with the solution, the surfaces having been previously rubbed unidirectionally. When illuminated with polarized light, the display switches from yellow in the absence of an applied voltage to substantially colorless in the presence of a voltage. In the other type of liquid crystal display used to demonstrate the present invention, the liquid crystal host was a cholesteric liquid crystal prepared by the addition of an optically active compound, such a CB-15 (from B.D.H. Co.) to one of the above-mentioned nematic liquid crystal materials. The concentration of the optically active compound was varied from about 1% to about 10%. The yellow tris-azo dyes of this invention were dissolved at a concentration of about 0.5 to about 1.0% in the cholesteric host. Upon application of a voltage, the yellow display became substantially colorless.

Examples of specific commercial nematic liquid crystals include E-7 from BDH Chemicals wherein the chemical structure is of the biphenyl type, and the temperature range is −10° to 60° C. with a dielectric anisotropy of 11; E-8 from BDH Chemicals having a basic chemical structure of the biphenyl type with a temperature range of about −10° to 70° C. with a dielectric anisotropy of 13; Licristal 1132 from E. Merck Associates of the phenylcyclohexane type having a temperature range of −6° to 70° C. with a dielectric anisotropy of 10; Licristal 1221 from E. Merck Associates of the phenylcyclohexane type having a temperature range of −10° to 90° C. with dielectric anisotropy of 8; ROTN-103 from Hoffman-LaRoche of the ester type having a temperature range from about −10° to 80° C. with dielectric anisotropy of 26; ROTN-200 from Hoffman-LaRoche of the Schiff base type having a temperature range of about −15° to 65° C. with a dielectric anisotropy of 18; and ROTN-404 from Hoffman-LaRoche of the biphenyl-pyrimidine type having a temperature range from about −10° to 105° C. and a dielectric anisotropy of 21.

The following examples further illustrate the practice of the invention, and they are meant to be exemplary only and are not to be construed as to limiting the invention in any way.

Liquid crystal displays of various color shades were fabricated by mixing one of the yellow azo dyes of the present invention with a dichroic dye of a different color. The following examples illustrate the utility of the novel dyes of the present invention. Unless otherwise specified, the yellow azo dye of the present invention which was used in the following examples was dye No. 3 in Table 1 above, otherwise designated as 4,4'-bis[2-methyl-4-(4-pentoxybenzoxy)phenylazo]-2-methyl-5-methoxyazobenzene.

EXAMPLE 1

Preparation of Tris-Azo Dye

The tetrazotization of 2-methyl-5-methoxy-4,4'-diaminoazobenzene was carried out by dissolving 0.015 moles (3.84 grams) of 2-methyl-5-methoxy-4,4'- diaminoazobenzene in a mixture of about 9 mls. of hydrochloric acid and about 45 mls. of water (dilute hydrochloric acid). The temperature of the resulting mixture was maintained at about 0° C. while adding about 2.25 grams (a slight excess of 0.03 moles) of sodium nitrite in about 10 mls. of water. The resulting clear tetrazonium solution was then coupled with about 0.03 M of m-cresol, previously dissolved in acetic acid and cooled to a temperature of about 5° C. The coupling reaction product was 4,4'-bis(2-methyl-4-hydroxyphenylazo)-2-methyl-5-methoxyazobenzene. This product was then reacted with 0.03 M (preferably an excess) of 4-pentoxybenzoyl chloride dissolved in pyridine. The solution was heated for about three hours at about 110° C. Upon cooling a yellow dye precipitated and was collected by filtration. The yellow dye is 4,4'-bis[2-methyl-4-(4-pentoxybenzoxy)phenylazo]-2-methyl-5-methoxyazobenzene.

EXAMPLE 2

The yellow azo dye prepared in Example 1 above (1.0% by weight based upon the weight of the liquid crystal host material) was added to a liquid crystal host mixture of ROTN-404, a biphenyl-pyrimidine of positive dielectric anisotropy having a temperature range of −10° C. to 105° C., the ROTN-404 liquid crystal containing 5% (by weight) CB-15 optically active chiral dopant from BDH Ltd. Optically active chiral dopant CB-15 is 4-cyano-4'-(2-methyl)butylbiphenyl having the formula:

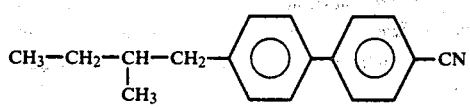

The mixture also contained 0.5% (by weight based upon the weight of the liquid crystal) blue dye, 4,4'-bis-(4-ethylaminonaphthylazo)-2-methyl-5-methoxyazobenzene. The formulation was heated to 90° C. to dissolve the dyes in the host material and was filtered. The liquid was placed in a test cell. The test cell was a conventional liquid crystal cell having a distance or gap of 18 microns between the plates. The cell was filled with the above dichroic liquid crystal composition containing the blue dye and the yellow dye of the present invention. White paint was applied to the back of the display cell, the reflectivity of the cell in the activated and unactivated states was measured. The contrast was 8:1, and the reflectivity in the activated state was 30%. The display appeared black and white to the viewer.

EXAMPLE 3

The yellow azo dye prepared in Example 1 above (1% by weight based upon the weight of the liquid crystal host material) was added to a liquid crystal host mixture of Licristal 1132, a phenylcyclohexane nematic liquid crystal having a temperature range from −6° C. to 70° C. from E. Merck Associates, containing 10% high melting terphenyl liquid crystal identified as T-15 from BDH, Ltd. and identified by the following formula:

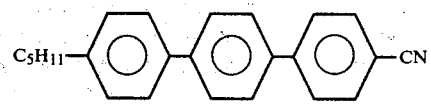

A purple dye, 4,4'-bis-(4-N,N-diethylamino-2-methylphenylazo)azobenzene, was added at a concentration of 0.05% by weight based upon the weight of the liquid crystal material. The foregoing formulation was mixed thoroughly and placed in a conventional liquid crystal test cell having a gap or distance of 12 microns between the plates. The cell was filled with the above dichroic liquid crystal composition. The walls of the display cell had been rubbed to give a parallel boundary condition. The addition of the yellow dye of this invention (Example 1 above) caused a shift in the peak absorption, and the display appeared to be red in the quiescent state and substantially colorless in the activated state. A single polarizer was used with this display to enhance the contrast.

EXAMPLE 4

An optically active additive, CB-15, described in Example 2 above, was added to liquid crystal E-7 from BDH, Ltd. to give a cholesteric liquid crystal with a 3.2 micron pitch. The dye of Example 1 above (1% by weight based upon the weight of the liquid crystal host material) and 0.5% by weight, based upon the weight of the liquid crystal material, of a violet dye identified as 4,4'-bis-(4-N,N-dimethylaminonaphthylazo)azobenzene, were also added to the composition. The formulation was thoroughly mixed and placed in a display cell. The cell was then switched between a substantially colorless state and an unactivated orange-red state. The cell could be switched with about 12 volts.

EXAMPLE 5

Optically active chiral dopant defined in Example 2 above, 5% by weight based upon the weight of the liquid crystal, was added to an ester liquid crystal as described in U.S. Pat. No. 3,984,344. The ester liquid crystal of U.S. Pat. No. 3,984,344 comprises a mixture of a substantial fraction of substituted cyanophenylbenzoates and at least one (non-nitrile bearing) substituted phenyl benzoate, which may be a single and/or double ester. Yellow tris-azo dye of this invention (1.0% by weight based upon the weight of the liquid crystal) was added along with 0.6% by weight, based upon the weight of the liquid crystal material, blue dye, 4,4'-bis-(4-ethylaminonaphthylazo)-2-methyl-5-methoxyazobenzene. The formulation was thoroughly mixed and placed in a conventional liquid crystal test cell having a gap or spacing between the cell substrates of about 12 microns. The display was then switched with a voltage of 12 volts from a greenish-black "off" state to a clear "on" state.

The utility of the yellow tris-azo dyes of this invention has been demonstrated. When used alone the dyes can be used to provide yellow or yellow-orange displays, or they can be used as additives in conjunction with other dyes to provide improved black dyes for black dichroic displays when used with liquid crystals. The dyes of the present invention can also be used as additives with other dyes to obtain varied or unusual color effects in liquid crystal displays. Furthermore, the yellow tris-azo dyes of the present invention have been shown to be useful with a wide variety of liquid crystal compositions and are compatible with known liquid crystals, such as Schiff base, esters, azoxy, biphenyl, phenylcyclohexane, biphenyl/pyrimidine-type liquid crystals and the like. The novel yellow or yellow-orange tris-azo dyes of the present invention can also be used for the dyeing of textiles, coloring of plastics or the coloring of any other media or substrates conventionally colored by azo dyes.

While other modifications of the invention and variations thereof which may be employed within the scope of the invention, have not been described, the invention is intended to include such modifications as may be embraced within the following claims.

What is claimed is:

1. A liquid crystal composition for use in a liquid crystal display comprising:
   a host liquid crystal material; and
   a guest dichroic dye dissolved in said host liquid crystal material, said dichroic dye having the general formula:

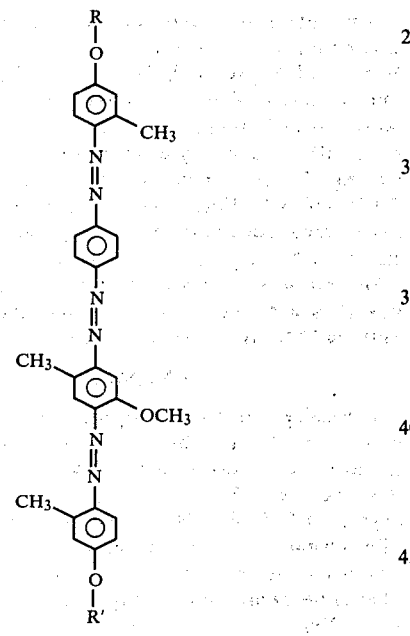

wherein R and R' are acyl groups and form an ester with the general formula, and R and R' have the formula:

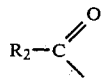

wherein $R_2$ is alkyl or halogen, nitro, amino, hydroxy or cyano substituted alkyl and the alkyl has from about 4 to about 20 carbon atoms, or $R_2$ is a phenyl; phenylalkyl; halogen, nitro, cyano, hydroxy, dialkylamino, amino, alkyl, phenyloxy, phenyl, or alkoxy parasubstituted phenyl or phenylalkyl; or 3,5-dialkoxyphenyl radical.

2. The composition of claim 1, wherein R=R'.

3. The composition of claim 1, wherein $R_2$ is selected from the group consisting of n-butyl, iso-butyl, n-amyl, n-hexyl, n-heptyl and stearyl and the halogen, nitro, amino and cyano derivatives thereof.

4. The composition of claim 1, wherein $R_2$ is an alkyl having from 4 to about 20 carbon atoms or the halogen, nitro, amino, or cyano derivatives thereof.

5. The composition of claim 1, wherein the phenyl or phenylalkyl parasubstituent is selected from the group consisting of halogen, hydroxy, nitro, cyano, amino, alkyl, phenyloxy and alkoxy.

6. The composition of claim 1, wherein the acyl group is selected from the group consisting of benzoyl, 4-methoxybenzoyl, 4-pentoxybenzoyl, 4-heptoxybenzoyl, 3,5-dimethoxybenzoyl, 4-pentylbenzoyl, 4-heptylbenzoyl, 4-cyanobenzoyl, 4-nitrobenzoyl, 4-N,N-dimethylaminobenzoyl and 4-phenoxybenzoyl.

7. The composition of claim 1, wherein about 0.05% by weight to about 1.0% by weight (based upon the weight of the liquid crystal) of the guest dichroic dye is dissolved in the host liquid crystal.

8. The composition of claim 1, wherein the host material is a nematic liquid crystal of positive or negative dielectric anisotropy, a cholesteric liquid crystal of positive or negative dielectric anisotropy and mixtures thereof or any of the foregoing modified with other optically active compounds.

9. A method of improving the black color of dichroic dyes for use in black liquid crystal displays, comprising adding to a host liquid crystal material, a dye composition having a mixture of dichroic dyes of various colors in proper proportion to obtain a material which absorbs radiation in the spectal range of about 400-700 nm wherein at least one of the dichroic dyes of various colors is a yellow azo dichroic dye having the general formula:

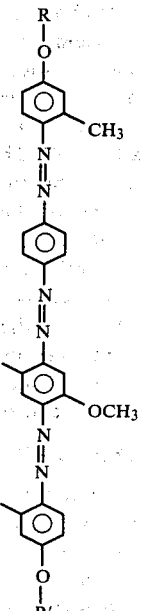

wherein R and R' are acyl groups and form an ester with the general formula, and R and R' have the formula:

wherein $R_2$ is alkyl or halogen, nitro, amino, hydroxy or cyano substituted alkyl and the alkyl has from about 4 to about 20 carbon atoms, or $R_2$ is a phenyl; phenylalkyl; halogen, nitro, cyano, hydroxy, dialkylamino, amino, alkyl, phenyloxy, phenyl, or alkoxy parasubstituted phenyl or phenylalkyl; or 3,5-dialkoxyphenyl radical; and heating the composition to dissolve the dyes in the liquid crystal host material.

10. The method of claim 9, wherein about 0.05% to about 1.0% of the yellow azo dichroic dye is added to the host liquid crystal material and the dichroic dyes of various colors.

11. The method of claim 10, wherein about 0.5% to about 1.0% blue dichroic dye is added to the host liquid crystal material.

12. The method of claim 9, wherein $R=R'$.

13. The method of claim 9, wherein $R_2$ is an alkyl having from 4 to about 20 carbon atoms or the halogen, nitro, amino or cyano derivatives thereof.

14. The method of claim 9, wherein the mixture is heated at about 60° C. to about 105° C. to dissolve the dichroic dyes in the host material.

15. The method of claim 9, wherein the phenyl or phenylalkyl parasubstituent is selected from the group consisting of halogen, hydroxy, nitro, cyano, amino, alkyl, phenyloxy and alkoxy.

16. An improved black dichroic liquid crystal display composition comprising:
a host liquid crystal material; and
a dye composition dissolved in said host, the dye composition having a mixture of dichroic dyes of various colors in proper proportion to obtain a material which absorbs radiation in the spectral range of about 400-700 nm wherein at least one of the dichroic dyes of various colors is a yellow azo dichroic dye having the general formula:

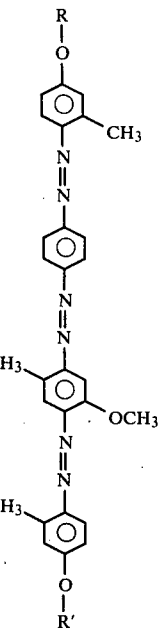

wherein R and R' are acyl groups and form an ester with the general formula, and R and R' have the formula:

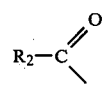

wherein $R_2$ is alkyl or halogen, nitro, amino, hydroxy, or cyano substituted alkyl, and the alkyl has from about 4 to about 20 carbon atoms, or $R_2$ is a phenyl; phenylalkyl; halogen, nitro, cyano, hydroxy, dialkylamino, amino, alkyl, phenyloxy, phenyl, or alkoxy parasubstituted phenyl or phenylalkyl; or 3,5-dialkoxyphenyl radical.

17. The black dichroic liquid crystal display composition of claim 16, comprising about 0.05% to about 1.0% by weight (based upon the weight of the liquid crystal) of the yellow azo dichroic dyes.

18. The black dichroic liquid crystal display composition of claim 16, comprising about 0.5% to about 1.0% blue dichroic dye.

19. The black dichroic liquid crystal display composition of claim 16, wherein $R=R'$.

20. The black dichroic liquid crystal display composition of claim 16, wherein $R_2$ is an alkyl having from 4 to about 20 carbon atoms or the halogen, nitro, amino or cyano derivatives thereof.

21. The black dichroic liquid crystal display composition of claim 16, wherein the phenyl or phenylalkyl parasubstituent is selected from the group consisting of halogen, hydroxy, nitro, cyano, amino, alkyl, phenyloxy and alkoxy.

22. The dye composition of claim 16, wherein the acyl group is selected from the group consisting of benzoyl, 4-methoxybenzoyl, 4-pentoxybenzoyl, 4-heptoxybenzoyl, 3,5-dimethoxybenzoyl, 4-pentylbenzoyl, 4-heptylbenzoyl, 4-cyanobenzoyl, 4-nitrobenzoyl, 4-N,N-dimethylaminobenzoyl and 4-phenoxybenzoyl.

23. The composition of claim 16, wherein the host material is a nematic liquid crystal of positive or negative dielectric anisotropy, a cholesteric liquid crystal of positive or negative dielectric anisotropy and mixtures thereof or any of the foregoing modified with other optically active compounds.

* * * * *